United States Patent
Fowler

(10) Patent No.: US 9,996,478 B1
(45) Date of Patent: Jun. 12, 2018

(54) NO ALLOCATE CACHE POLICY

(71) Applicant: Advanced Micro Devices, Inc., Sunnyvale, CA (US)

(72) Inventor: Mark Fowler, Hopkinton, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days. days.

(21) Appl. No.: 15/374,788

(22) Filed: Dec. 9, 2016

(51) Int. Cl.
G06F 12/08 (2016.01)
G06F 12/128 (2016.01)
G06F 12/122 (2016.01)

(52) U.S. Cl.
CPC .......... G06F 12/128 (2013.01); G06F 12/122 (2013.01); *G06F 2212/621* (2013.01); *G06F 2212/69* (2013.01)

(58) Field of Classification Search
None
See application file for complete search history.

(56) References Cited

U.S. PATENT DOCUMENTS

| 6,275,904 | B1 | 8/2001 | Chennupaty et al. |
| 8,230,179 | B2 | 7/2012 | Kriegel et al. |
| 8,542,247 | B1* | 9/2013 | Hakura ............ G06T 15/005 345/620 |
| 9,720,837 | B2 | 8/2017 | Bradbury et al. |
| 2009/0287885 | A1 | 11/2009 | Kriegel et al. |

* cited by examiner

*Primary Examiner* — Duc Doan
(74) *Attorney, Agent, or Firm* — Rory D. Rankin; Meyertons, Hood, Kivlin, Kowert & Goetzel, P.C.

(57) ABSTRACT

A system and method for efficiently performing data allocation in a cache memory are described. A lookup is performed in a cache responsive to detecting an access request. If the targeted data is found in the cache and the targeted data is of a no allocate data type indicating the targeted data is not expected to be reused, then the targeted data is read from the cache without updating cache replacement policy information for the targeted data responsive to the access. If the lookup results in a miss, the targeted data is prevented from being allocated in the cache.

20 Claims, 4 Drawing Sheets

NO ALLOCATE CACHE POLICY

BACKGROUND

Description of the Relevant Art

In various embodiments, a microprocessor is coupled to one or more levels of a cache hierarchy. As is well understood in the art, caches are used to reduce the latency of requests for data stored in memory. Generally, a cache stores one or more blocks of data, each of which is a copy of data stored at a corresponding address in the system memory. While in the cache, the data may be updated as it is operated upon by the microprocessor. Since caches have a finite size, the total number of cache blocks is inherently bounded. Additionally, there is a limit on the number of blocks that map to a given set in a set-associative cache.

Once particular data occupies an available cache storage location, the occupied cache location is unavailable for other data until the data currently stored in the location is evicted. In some cases, however, it is expected that the particular data stored in the cache will not be reused or will only be reused fewer than a given number of time (e.g., the data may be expected to be reused only once or a relatively small number of times. Consequently, data that is occupying the cache with no expected reuse prevents other data that may have a higher predicted reuse from using that location of the cache. As a result, access latencies may be increased and overall performance decreased.

In view of the above, efficient methods and systems for efficiently performing data allocation in a cache memory are desired.

Figure 1:
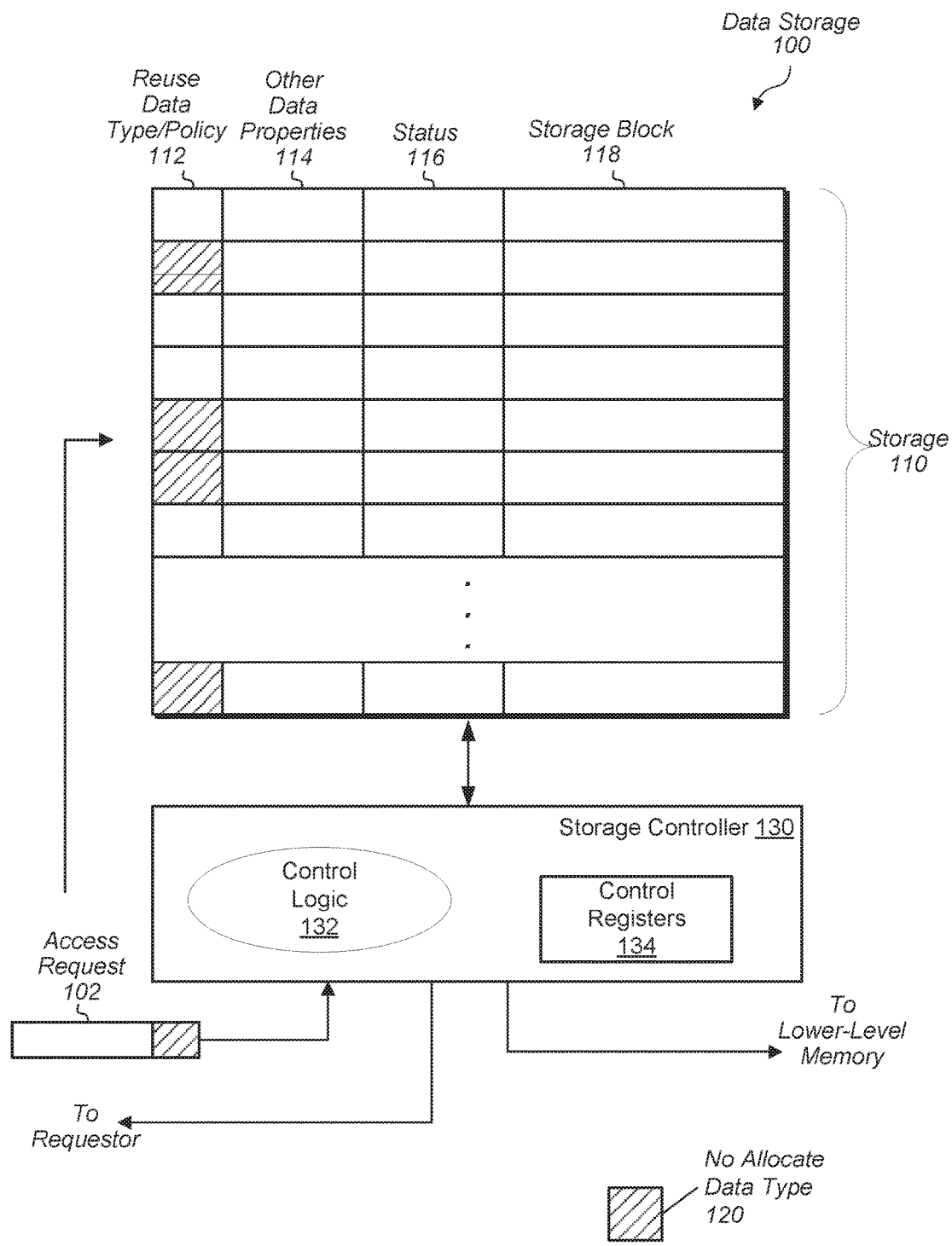
FIG. 1 is a generalized diagram of one embodiment of data storage.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for allocating data that is not expected to be reused in a storage array are contemplated. In various embodiments, the storage array includes multiple blocks for storing data and a storage controller is coupled to the storage array for controlling access to the multiple blocks. In some embodiments, the storage array is a set associative cache array. However, in other embodiments, the storage array is one of a variety of storage resources such as a fully associative queue, a content addressable memory (CAM) array, a first-in-first-out (FIFO) queue, a direct mapped cache and so forth.

In various embodiments, the data stored in the storage array is marked as data that is not expected to be reused. In some embodiments, access requests for given data in the storage array include an indication that the given data being accessed is not expected to be reused. In some embodiments, the storage controller determines whether an access request corresponds to data not expected to be reused by determining whether the access request targets a particular address range or is associated with a given source identifier (ID). Further, in various embodiments, the storage controller prevents allocating the given data of the expected no reuse type in the storage array when the storage controller does not find the given data in the storage array for an access request.

Turning to FIG. 1, a generalized block diagram of one embodiment of data storage 100 is shown. The storage array 110 includes multiple entries for storing data and corresponding metadata. In various embodiments, the storage array 110 is shared by multiple threads being processed by a general-purpose processor or a parallel architecture processor such as a graphics processing unit or a digital signal processor. In one embodiment, the storage array 110 corresponds to a queue used for data storage on a processor core. In other embodiments, the storage array 110 corresponds to a cache array within a given level of one or more levels of a cache memory hierarchy. For example, the storage array is a set associative cache array. However, in other embodiments, the storage array is one of a variety of storage resources such as a fully associative queue, a content addressable memory (CAM) array, a first-in-first-out (FIFO) queue, a direct mapped cache and so forth.

As shown, each entry of the storage array 110 includes multiple fields 112-118. Although the information stored in the fields 112-118 is shown as being stored in a contiguous manner, in various embodiments, the data is stored in a different order, stored in a non-contiguous manner, and stored with other fields not shown. Additionally, in some embodiments, the storage array 110 includes two or more separate arrays for storing the fields 112-118.

In various embodiments, the reuse data type field 112 indicates the data associated with the entry is a no allocate data type 120. While the following discussion describes a "no allocate data type", this may be viewed as a cache policy associated with the data rather than a type of data, per se. Accordingly, where the no allocate data type is mentioned, this may alternatively be read as a no allocate policy associated with the data. In various embodiments, the no allocate data type indicates the data is not expected to be reused. For example, the data is generated and determined to be used once, whereas other data may be expected to be reused multiple times. In one example, video graphics rendering includes vector shading calculations. Some vertex shading results are reused for efficient processing, whereas other vertex shading results are used a single time. A vertex index is used to indicate which results are reused and which results are used a single time. Results indicated as being used a single time are marked with the no allocate data type 120.

In various embodiments, the no allocate data type 120 changes the steps used by algorithms for handling the read/write operations for the storage array 110. As described later, these changes are aimed at reducing the number of allocated entries in the storage array 110 that are storing data with no expected reuse. In various embodiments, the source of the access request determines when data is not expected to be reused and provides an indication that the data corresponds to the no allocate data type 120.

In some embodiments, it is determined that particular data is expected to be used a given number of times. In the above vertex shading example, a vertex index associated with result data indicates the result data is used twice rather than a single time. In some embodiments, a table stores the vertex index for partitions of a frame of data and it is determined from the table that the vertex index indicates the number of times the associated result data is later used. In various embodiments, a count is maintained of the number of expected uses for the result data. The count is updated, such as decremented, after each time the result data is used on a calculation completion basis, a thread completion basis, an access completion basis, or otherwise. When the count indicates the result data is not expected to be reused any further, the result data is marked as the no allocate data type 120. Subsequently, the data may be treated as corresponding to the no allocate type.

In some embodiments, the other data properties field 114 indicates the data stored in the entry corresponds to a particular calculation, a process identifier (ID) and/or a thread ID, a priority level, a node ownership ID, an indication of whether the node owner is remote versus a local, and so forth. In various embodiments, the status field 116 stores age information such as Least Recently Used (LRU) cache replacement policy information used in association with a storage block replacement algorithm employed by the storage controller 130. The status field 116 also stores an indication of clean (unmodified) or dirty (modified) state for the stored data and a valid status for the stored data. In some embodiments, the status field 116 also stores an indication that designates a cache coherency state such as modified, exclusive, owned, shared, and invalid. The storage block 118 stores the data in the allocated entry. One of a variety of sizes is used for the data stored in the storage block 118. In various embodiments, the storage block 118 is one way of multiple ways of a set associative cache.

The storage controller 130 includes control logic 132 and control registers 134. In various embodiments, the control logic 132 includes hardware circuitry and/or software for implementing algorithms for allocating and deallocating entries in the storage array 110, and for updating counters, pointers and state information stored in the storage array 110. In some embodiments, the control registers 134 include programmable control and status registers to be used by the control logic 132 for implementing the algorithms. The control logic 132 and control registers 134 within the storage controller 130 can also be referred to as a control unit. The storage controller 130 also includes interface logic (not shown) for communication with the storage array 110, other memories and result buses.

In various embodiments, the storage array 110 is a cache array for storing result data and the storage controller 130 is a cache controller. As used herein, the term "block" is used to refer to a set of bytes stored in contiguous memory locations, which are treated as a unit for coherency purposes in a cache. As used herein, the terms "cache block", "block", "cache line", and "line" are interchangeable. In some embodiments, a block is the unit of allocation and deallocation in the cache. Any one of a variety of sizes is used to indicate the number of bytes in the block.

As used herein, the term "access" regarding a cache memory subsystem refers to performing a read or a write request operation that results in a cache hit if the requested data of a corresponding request address resides in the storage array 110. The read or write request operation results in a cache miss if the requested data of the corresponding request address does not reside in the storage array 110. If a cache miss occurs, then a read request is generated by the storage controller 130 and transmitted to lower-level memory via a memory controller. A corresponding cache fill line with the requested block is conveyed to the storage array 110 in order to complete the original read or write request when the operation is not modified by the limited reuse data type as described later. In addition, the cache fill line is placed within the cache.

When there are no available storage blocks 118 within the storage array 110, a Least Recently Used (LRU) algorithm (or other replacement policy algorithm) implemented by the storage controller 130 determines which entry (e.g., which way within a set associative cache) is to have its data evicted from the cache and replaced by the cache fill line data. As used herein, the term "allocate" refers to storing a cache fill line fetched from a lower level of the memory hierarchy into a way of a particular cache subsequent a cache miss to the particular cache. In various embodiments, selection of a cache block to evict from the cache is based on one or more of the parameters stored in the fields 112, 114 and 116.

In various embodiments, the steps followed by the algorithms in the storage controller 130 change based on the no allocate data type/policy 120. For example, the storage controller 130 receives the access request 102. In some embodiments, the access request 102 indicates whether the associated data is of the no allocate data type 120. In other embodiments, the programmable control registers 134 within the storage controller 130 are updated and the control logic 132 determines whether the data associated with the received access request 102 is of the no allocate data type 120. For example, particular sources, indications of particular calculations using the data, and so forth are used by the control logic 132 to determine whether the data associated with the received access request 102 is of the no allocate data type 120. In yet further embodiments, an indication indicating data corresponding to the access request 102 is of the no allocate data type 120 is stored in the field 112 of the storage array 130 or in a table within the storage controller 130.

If the storage controller 130 determines the given data is of the no allocate data type 120 and the storage controller 130 additionally finds the data in the storage array 110, then the storage controller 130 does not update the cache replacement policy information for the data to extends its life within the cache. For example, LRU data for the data is not updated in response to the access. In various embodiments, the storage controller 130 additionally prevents allocating the given data in the storage array 110 after a miss occurs for a read request.

Figure 2:
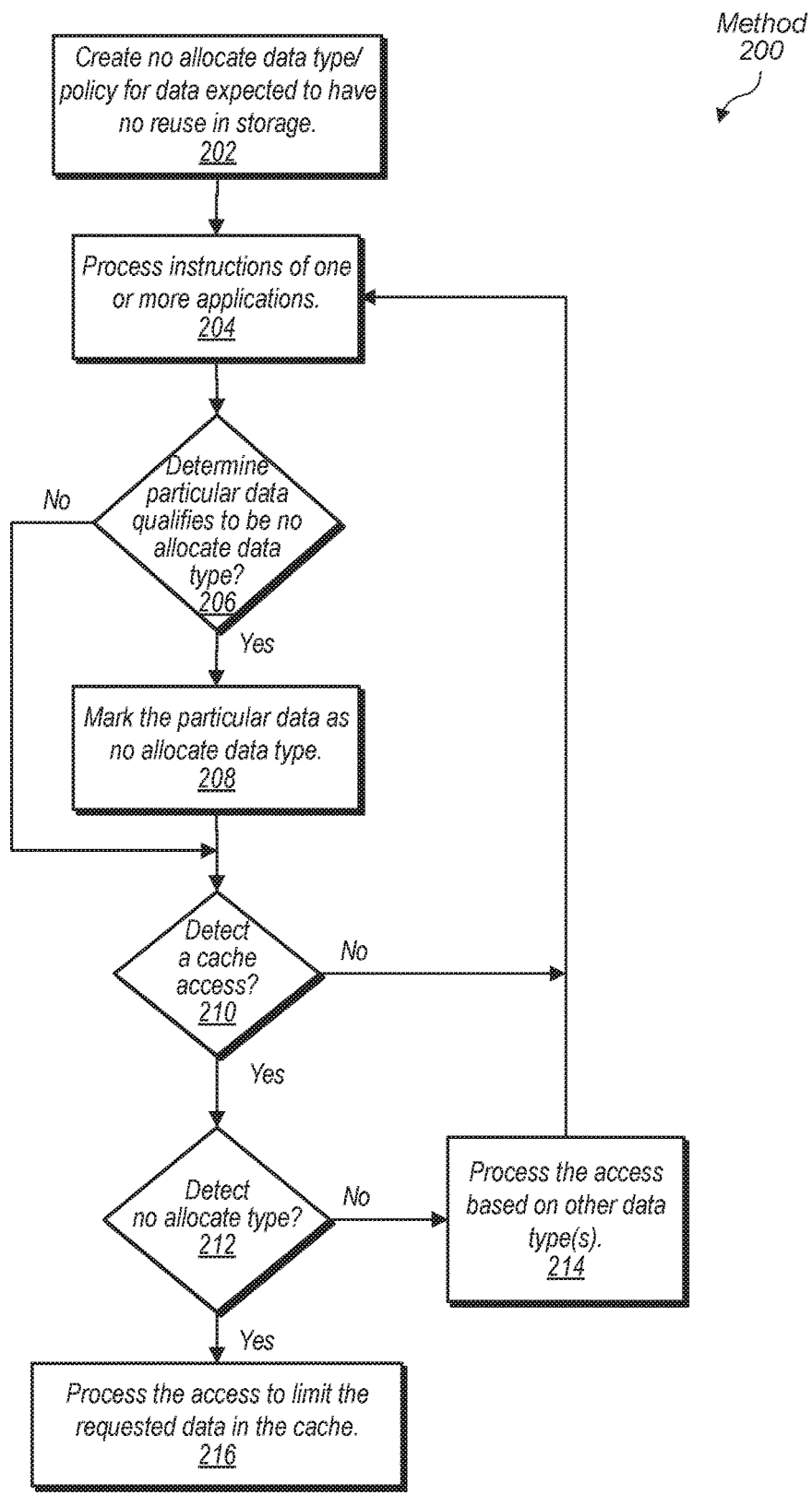
FIG. 2 is a generalized diagram of one embodiment of a method for processing applications with data not expected to be reused.

Referring now to FIG. 2, one embodiment of a method 200 for processing applications with data not expected to be reused is shown. For purposes of discussion, the steps in this embodiment (as well as in FIGS. 3-4) are shown in sequential order. However, in other embodiments some steps occur in a different order than shown, some steps are performed concurrently, some steps are combined with other steps, and some steps are absent.

A no allocate data type or policy is created for data that is not expected to be reused (block 202). For example, a particular encoding is selected to identify data not expected to be reused. In various embodiments, one or more control and status registers are programmed with the particular encoding to be used in control logic during access requests of given storage arrays. In some embodiments, the control and status registers are in storage controllers such as cache controllers. In some embodiments, the determination that data is not expected to be reused is based on particular sources generating access requests, particular calculations using the data, particular address ranges being accessed, or otherwise.

As described earlier, in various embodiments, one particular type of calculation includes vertex shading in a graphics processing pipeline. Some vertex shading results are reused during processing, while other vertex shading results are used only a single time. In some embodiments, a vertex index stored in a particular table is used to identify data that is not expected to be reused. In block 204 of FIG. 2, program instructions are executed and storage, such as a cache, is accessed. If particular data qualifies as data that is not expected to be reused during the processing of the applications ("yes" branch of the conditional block 206), then the particular data is marked as the no allocate data type (block 208). If a cache access is subsequently detected ("yes" branch of the conditional block 210), but the requested data is not marked or otherwise indicated to be of the no allocate data type ("no" branch of the conditional block 212), then the cache access is not processed as a no allocate data type (block 214) as described in association with FIGS. 3 and 4.

Figure 3:
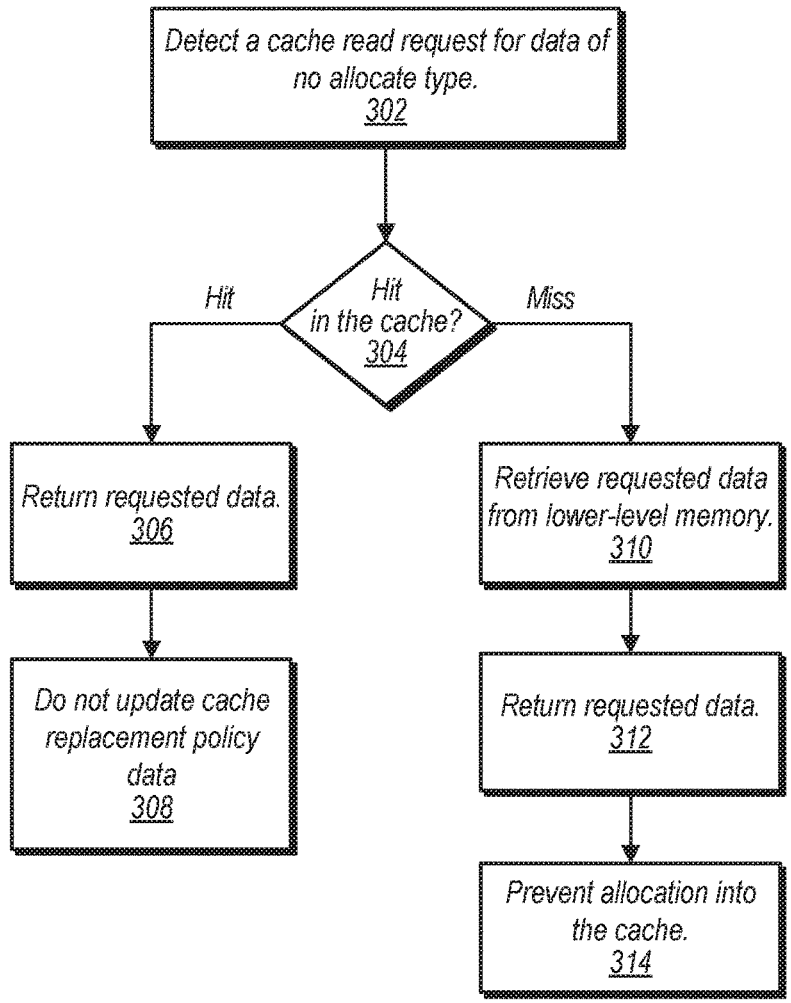
FIG. 3 is a generalized diagram of one embodiment of a method for performing a read access request for data not expected to be reused.
Figure 4:
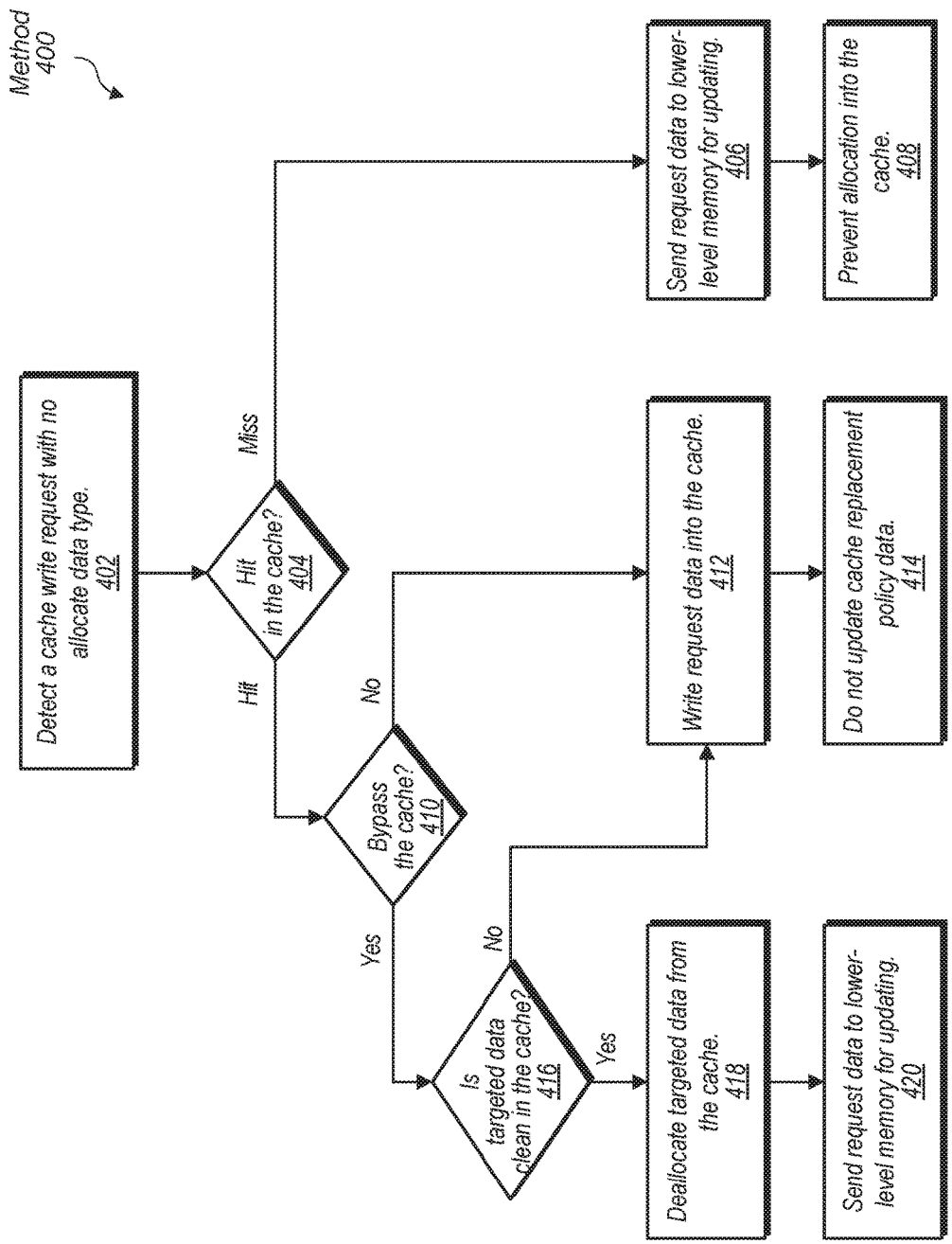
FIG. 4 is a generalized diagram of one embodiment of a method for performing a write access request for data not expected to be reused.

However, if a cache access is detected ("yes" branch of the conditional block 210), and the data is marked or otherwise determined to be of the no allocate data type ("yes" branch of the conditional block 212), then the cache access is processed in a manner that limits the life of the data in the cache (block 216) as described in association with FIGS. 3 and 4. For example, the cache controller may prevent allocation of the associated data in the cache after a miss in the cache. Limiting the number of cache blocks with the no allocate data type by performing these steps leaves more room in the cache for data more likely to be reused.

Turning now to FIG. 3, one embodiment of a method 300 for performing a read access request for data not expected to be reused is shown. As one or more software applications are being processed, a data access request is detected (block 302) and a cache is accessed for the data. As described earlier, multiple methods may be used to determine whether data corresponding to an access request is of the no allocate data type. In this case, the read request is for data of the no allocate data type. A lookup operation into the cache is performed for the read request. If a hit occurs ("yes" branch of the conditional block 304), then the requested data is read from the cache array and returned to the requestor (block 306). Although the stored data is accessed in the cache array, in one embodiment the cache controller does not update the accessed cache block to indicate this most recent access (block 308). For example, the cache controller does not update data used for a cache replacement policy based on the access. In one embodiment, an age of last use of the data or any other least recently used (LRU) information is not updated. Therefore, the access does not increase the amount of time that the data remains in the cache. Rather, the cache replacement policy data for the accessed cache data remains unchanged as though the access had not occurred.

If the lookup operation into the cache array results in a miss ("no" branch of the conditional block 304), then the requested data is retrieved from lower-level memory (block 310). The requested data is returned in order to service the request (block 312). However, the retrieved data is not allocated into the cache (block 314). Therefore, the amount of data of the no allocate data type (data that is not expected to be reused) is not increased in the cache.

Referring now to FIG. 4, one embodiment of a method 400 for performing a write access request for data not expected to be reused is shown. As one or more software applications are being processed, a cache is accessed for data. As described earlier, multiple methods are used to determine whether data corresponding to an access request is of the no allocate data type. In the example shown, a cache write request for data of the no allocate data type is detected (block 402). A lookup operation into the cache is performed for the write request. If a hit occurs ("yes" branch of the conditional block 404), and no indication for bypassing the cache is detected ("no" branch of the conditional block 410), then the write request data is written into the cache array (block 412). Although the stored data is accessed and updated in the cache, the cache controller does not update the cache replacement policy data, such as least recently used data, for the cache block (block 414). Therefore, the life of the data in the cache is not extended due to the access.

If a hit occurs ("yes" branch of the conditional block 404), and an indication for bypassing the cache is detected ("yes" branch of the conditional block 410), then reducing the amount of data of the no allocate data type in the cache becomes more aggressive. For example, if the data stored in the cache and being targeted by the write request is clean (unmodified) ("yes" branch of the conditional block 416), then the targeted data is deallocated (or invalidated) from the cache (block 418) and the write request data is sent to lower-level memory for updating the copy of the targeted data in the lower-level memory (block 420).

If the indication for bypassing the cache is detected ("yes" branch of the conditional block 410), but the data stored in the cache and being targeted by the write request is dirty (modified) ("no" branch of the conditional block 416), then control flow of method 400 moves to block 412 where the write request data is written into the cache array. In some embodiments, both clean and dirty sub-blocks are identified within the targeted data. In some embodiments, the sub-blocks are one or more bytes within a multi-byte cache line. A bit vector is used to indicate which sub-blocks are clean and which sub-blocks are dirty. When a hit occurs ("yes" branch of the conditional block 404), and the indication for bypassing the cache is detected ("yes" branch of the conditional block 410), the clean sub-blocks are deallocated from the cache while the dirty sub-blocks remain. If any of the dirty sub-blocks are targeted by the write request, then they are modified within the cache with the write request data. If any of the clean sub-blocks are targeted by the write request, then they are modified in the lower-level memory with the write request data.

If the lookup operation into the cache array results in a miss ("no" branch of the conditional block 404), then the write request data is sent to lower-level memory for updating the targeted data (block 406). The targeted data is prevented from being allocated into the cache (block 408). Therefore, the amount of data of the limited reuse data type is reduced in the cache.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a cache comprising a plurality of blocks for storing data; and
   a cache controller coupled to the cache, wherein in response to detecting an access request for given data, the cache controller is configured to:
      determine whether the given data is indicated as being expected to be reused; and
      in response to determining the access request misses in the cache:
         allocate the given data in the cache, responsive to determining the given data is indicated as expected to be reused; and
         prevent allocating the given data in the cache, responsive to determining the given data is indicated as not expected to be reused.

2. The computing system as recited in claim 1, wherein in response to determining the access request hits in the cache, the cache controller does not update cache replacement policy information for the given data in the cache responsive to the access.

3. The computing system as recited in claim 2, wherein the cache replacement policy information is least recently used data.

4. The computing system as recited in claim 1, wherein determining whether the given data is indicated as being expected to be reused comprises detecting an indication in the access request indicating whether the given data is expected to be reused.

5. The computing system as recited in claim 1, wherein determining whether the given data is indicated as being expected to be reused comprises determining the access request indicates an address within a given address range.

6. The computing system as recited in claim 1, wherein determining the given data is not expected to be reused comprises determining the given data comprises results of vertex shading in a graphics pipeline.

7. The computing system as recited in claim 1, wherein the cache controller is further configured to deallocate the given data from the cache without modification by write data responsive to:
   determining the access request is a write request that hits in the cache; and
   detecting the given data is clean in the cache.

8. The computing system as recited in claim 7, wherein the cache controller is further configured to send write request data to lower-level memory.

9. The computing system as recited in claim 7, wherein the cache controller is further configured to:
   identify both clean and dirty sub-blocks within the given data;
   deallocate the clean sub-blocks from the cache without modification with write request data; and
   modify the dirty sub-blocks with write request data.

10. A method for managing data in a memory system, the method comprising:
    interface logic receiving a request for access to given data stored in the memory system;
    cache control logic:
       determining whether the given data is indicated as being expected to be reused;
       in response to determining the access request misses in the cache:
          allocating the given data in the cache, responsive to determining the given data is indicated as expected to be reused; and
          preventing allocation of the given data in the cache, responsive to determining the given data is indicated as not expected to be reused.

11. The method as recited in claim 10, wherein in response to determining the access request hits in the cache, the method further comprises preventing an update of cache replacement policy information for the given data responsive to the access.

12. The method as recited in claim 11, wherein the cache replacement policy information is least recently used data.

13. The method as recited in claim 10, further comprising deallocating the given data from the cache without modification by the write request responsive to:

determining the access request is a write request that hits in the cache; and detecting the given data is clean in the cache.

14. The method as recited in claim 13, further comprising sending write request data to lower-level memory.

15. The method as recited in claim 13, further comprising:

identifying both clean and dirty sub-blocks within the given data;

deallocating the clean sub-blocks from the cache without modification with write request data; and modifying the dirty sub-blocks with write request data.

16. The method as recited in claim 10, wherein determining the given data is not expected to be reused comprises determining the given data comprises results of vertex shading in a graphics pipeline.

17. A cache controller comprising:

a first interface coupled to a cache comprising a plurality of blocks for storing data; and a control unit; and wherein in response to detecting an access request for given data, the control unit is configured to:

determine whether the given data is indicated as being expected to be reused;

in response to determining the access request misses in the cache:

allocate the given data in the cache, responsive to determining the given data is indicated as expected to be reused; and prevent allocating the given data in the cache, responsive to determining the given data is indicated as not expected to be reused.

18. The cache controller as recited in claim 17, wherein in response to determining the access request hits in the cache, the control unit does not update cache replacement policy information for the given data in the cache responsive to the access.

19. The cache controller as recited in claim 18, wherein the cache replacement policy information is least recently used data.

20. The cache controller as recited in claim 17, wherein the control unit is further configured to deallocate the given data from the cache without modification with write request data responsive to:

determining the access request is a write request that hits in the cache; and detecting the given data is clean in the cache.

* * * * *